(12) United States Patent
Byrne

(10) Patent No.: US 6,187,194 B1
(45) Date of Patent: Feb. 13, 2001

(54) PACKAGED AERATION AND FILTRATION SYSTEM

(75) Inventor: Thomas Byrne, Rolling Meadows, IL (US)

(73) Assignee: Ichthyotech, Ltd., Rolling Meadows, IL (US)

( * ) Notice: Under 35 U.S.C. 154(b), the term of this patent shall be extended for 0 days.

(21) Appl. No.: 09/145,444

(22) Filed: Sep. 2, 1998

(51) Int. Cl.⁷ .................. C02F 3/00; E04H 4/12

(52) U.S. Cl. .......... 210/612; 210/617; 210/629; 210/169; 210/170; 210/179; 210/807; 210/291; 210/290

(58) Field of Search ............... 210/612, 617, 210/629, 169, 179, 807, 170, 291, 287, 288, 289, 290; 405/43, 44, 45, 46, 47, 48, 49

(56) References Cited

U.S. PATENT DOCUMENTS

| | | |
|---|---|---|
| 2,795,542 | 6/1957 | Horne et al. . |
| 2,848,111 * | 8/1958 | Gare . |
| 3,149,608 * | 9/1964 | Murphy . |
| 3,169,921 | 2/1965 | Griffith . |
| 3,418,973 * | 12/1968 | Saito . |
| 3,490,416 * | 1/1970 | Kelley . |
| 3,771,492 | 11/1973 | Doherty . |
| 3,817,858 | 6/1974 | Yost . |
| 3,879,285 | 4/1975 | Yost . |
| 3,889,639 | 6/1975 | Day et al. . |
| 3,923,656 | 12/1975 | Krebs et al. . |
| 3,966,604 | 6/1976 | Diggs . |
| 4,002,561 | 1/1977 | Traverse . |
| 4,151,810 * | 5/1979 | Wiggins ................. 119/5 |
| 4,211,183 | 7/1980 | Hoult . |
| 4,246,114 | 1/1981 | Krebs et al. . |
| 4,276,164 | 6/1981 | Martone et al. . |
| 4,303,350 | 12/1981 | Dix . |
| 4,372,856 | 2/1983 | Morrison . |
| 4,379,125 * | 4/1983 | Benninger ............... 422/274 |
| 4,414,919 | 11/1983 | Hess . |
| 4,525,277 | 6/1985 | Poulin . |
| 4,582,610 | 4/1986 | Baker . |
| 4,686,045 | 8/1987 | McKee . |
| 4,752,402 | 6/1988 | Gray . |
| 4,789,487 | 12/1988 | Wallace . |
| 4,817,561 | 4/1989 | Byrne et al. . |
| 4,824,287 | 4/1989 | Tracy . |
| 4,824,572 | 4/1989 | Scott . |
| 4,826,601 | 5/1989 | Spratt et al. . |
| 4,897,188 * | 1/1990 | Ogawa .................. 210/169 |
| 4,995,980 * | 2/1991 | Jaubert .................. 210/169 |
| 5,057,221 | 10/1991 | Bryant et al. . |
| 5,198,113 | 3/1993 | Daniels . |
| 5,275,123 | 1/1994 | Geung . |
| 5,281,332 | 1/1994 | Vandervelde et al. . |
| 5,294,337 * | 3/1994 | Johnson ................. 210/266 |
| 5,326,475 | 7/1994 | Kent . |
| 5,382,363 | 1/1995 | Boylen . |
| 5,441,632 | 8/1995 | Charon . |
| 5,492,635 | 2/1996 | Ball . |
| 5,510,022 | 4/1996 | Mullis . |
| 5,514,285 | 5/1996 | Rizk et al. . |
| 5,534,147 | 7/1996 | Kallenbach et al. . |
| 5,547,589 | 8/1996 | Carroll, II . |
| 5,565,096 | 10/1996 | Phelan . |
| 5,584,991 | 12/1996 | Wittstock et al. . |

(List continued on next page.)

Primary Examiner—Chester T. Barry
(74) Attorney, Agent, or Firm—Wallenstein & Wagner, Ltd.

(57) ABSTRACT

An aeration and filtration system for eliminating waste products in a fluid body having a surface floor is disclosed. The aeration and filtration system includes a support bed disposed above the surface floor of the fluid body and a filter bed of porous media disposed above the support bed. The system further includes a pump having a plurality of inlets adjacent the fluid body level, at least some of the inlets being a plurality of perforated pipes connected to the pump for drawing fluid to and through the filter bed, and a motor connected to the pump.

31 Claims, 5 Drawing Sheets

U.S. PATENT DOCUMENTS

| | | |
|---|---|---|
| 5,618,414 | 4/1997 | Goupil et al. . |
| 5,618,417 | 4/1997 | Spindler . |
| 5,620,593 | 4/1997 | Stagner . |
| 5,620,602 | 4/1997 | Stuth . |
| 5,626,437 | 5/1997 | Hunt et al. . |
| 5,641,020 | 6/1997 | Cherry et al. . |
| 5,645,732 | 7/1997 | Daniels . |
| 5,853,578 * | 12/1998 | Flyaks et al. ........................ 210/169 |
| 5,980,755 * | 11/1999 | Roberts ................................ 210/741 |

* cited by examiner

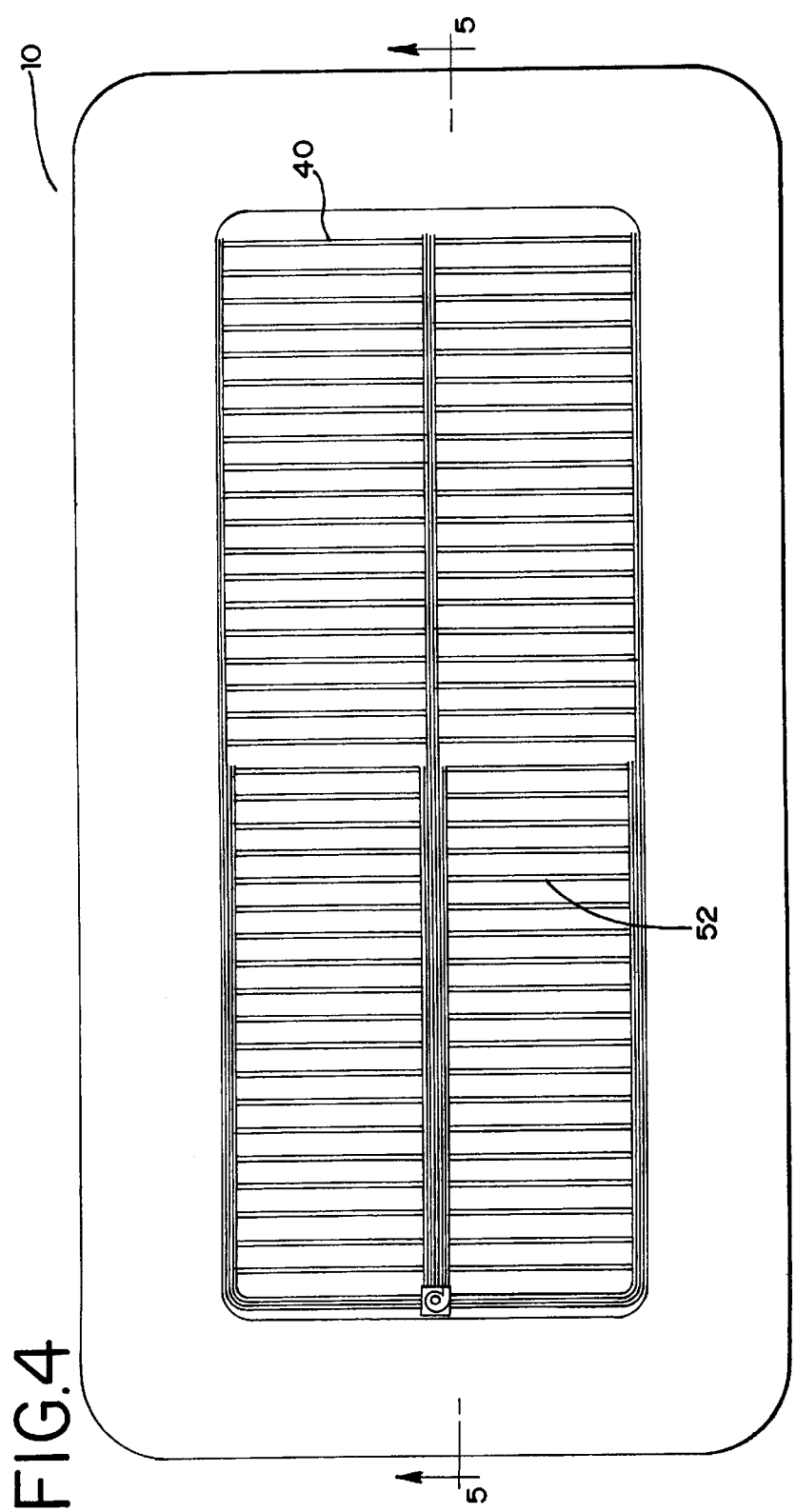
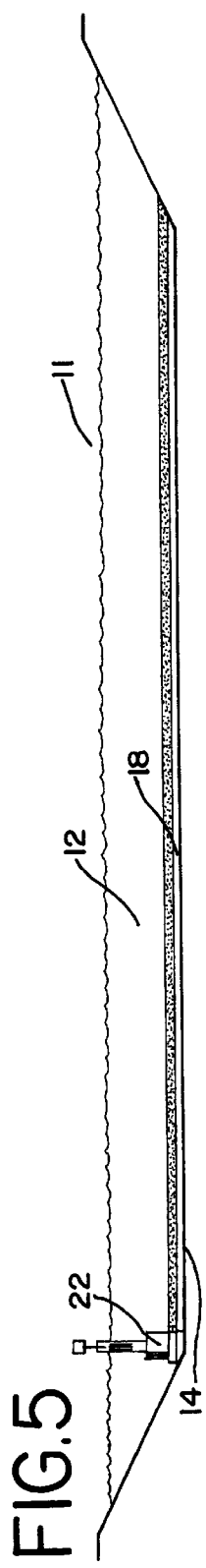
FIG.4
FIG.5

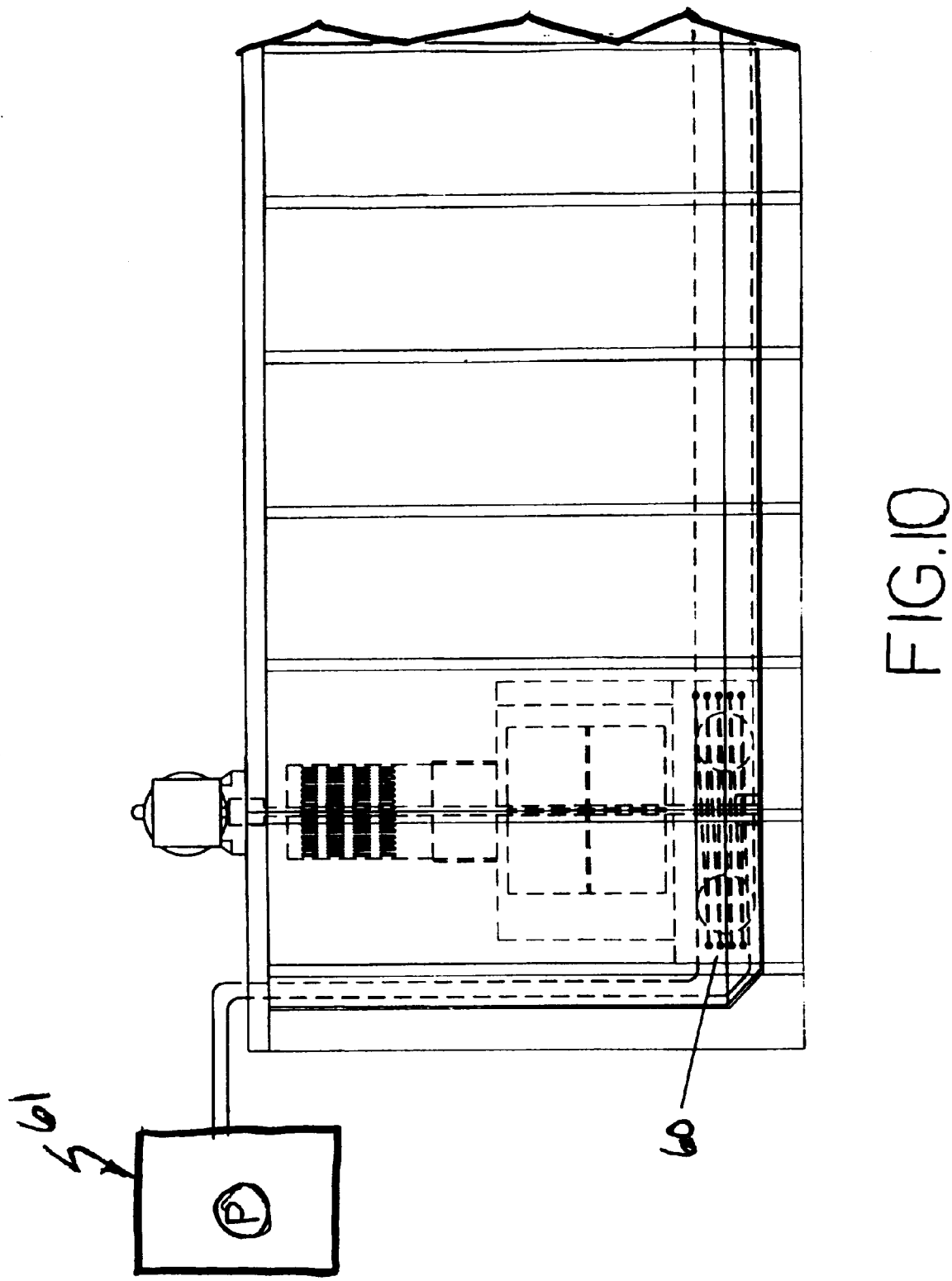

PACKAGED AERATION AND FILTRATION SYSTEM

TECHNICAL FIELD

The present device generally relates to an aeration and filtration system for eliminating waste products in a fluid and effectively aerating and purifying the liquid in either a pond or a high-volume tank.

BACKGROUND OF THE INVENTION

Typically, pond structures or high-volume tanks are used for raising and sustaining various forms of aquatic life for commercial sales, environmental testing or similar applications which require sustaining large quantities of such life. It is, therefore, generally desirable to ensure that the water in the pond structure, or alternatively in the high-volume tank, be maintained substantially free of organic-based materials, such as excess fish food, excrements and other contaminants which may be damaging to the aquatic life. Several different types of filters and aerators have been developed which have met with varying degrees of success in maintaining the desired water conditions. However, in general these have not proven to be entirely satisfactory, either because they do not have sufficient water circulation capacity, require regular replacement of all of the water in the tank, are expensive to manufacture, costly to operate, difficult to clean, or not suitable for high-volume application.

In most filtering systems, aerobic bacteria are developed on the filter bed or filter element which is designed to destroy waste and purify the water. However, limited circulation of the water in the system causes difficulty in producing an effective and efficient bacterial action which will dispose of the wastes in the water. Thus, in many instances, the filter must be frequently cleaned or replaced.

Many systems have been developed for filtering small-capacity fish tanks like the aquariums found in homes. For example, U.S. Pat. No. 3,722,685 discloses a water pump-induced circulation system, wherein a lower chamber is defined in the bottom of the aquarium tank and has a centrifugal water pump which draws water from the chamber and circulates the water through a filter that is located above the water level for easy access for replacement. The cleansed water, after passing through the filter, is returned to the bottom chamber within the tank. This system is designed for a large capacity pump to draw from the bottom of the tank through the upper exposed filter. Again, with such a system, it is extremely difficult to provide enough oxygen supply into the liquid in the tank to support aquatic life because the oxygen is supplied to the water by absorption at the surface.

To address the above-mentioned problem, systems such as the one disclosed in U.S. Pat. No. 4,817,561 to Byrne et. al. have been developed. Byrne discloses an aeration and filtration system for an aquarium. The system includes a porous filter bed and a pump located in a chamber below the filter bed. The system in Byrne draws oxygen-enriched liquid and oxygen-depleted liquid into the pump chamber and mixes the liquid in that chamber. The oxygen-enriched mixture is then expelled into the fluid environment. The system in Byrne addresses the problem of disposing of materials which may be collected in a filter without frequent filter replacement. Byrne also addresses the problems of providing enough oxygen supply into the liquid in the tank to support aquatic life.

Other more elaborate types of aeration and filtering systems have been developed for raising aquatic life in ponds or in high-volume tanks, such as those disclosed in U.S. Pat. Nos. 3,889,639; 4,221,183 and 5,510,022. However, most of the known prior art systems are costly to manufacture or costly to maintain.

SUMMARY OF THE INVENTION

The invention is an aeration and filtration system comprising a support bed disposed above the surface floor of the fluid body and a filter bed of porous media disposed above the support bed. The system further includes a motor and pump. The pump has a plurality of inlets and at least some of the inlets are a plurality of perforated pipes connected to the pump for drawing fluid to and through the filter bed.

An object of the invention is to provide an aerobically balanced aeration and filtration system in which aerobic bacteria process the waste products of the aquatic life form living in the system, while substantially reducing toxin levels in the aquatic environment.

It is another object of the invention to provide an aeration and filtration system in which a balanced environment is maintained for extended periods without replacement of filtration elements.

Another object is to provide a system which has sufficient capacity to rapidly and efficiently recirculate all of the liquid within the aquatic environment by entraining and funneling the large quantities of liquid in the system into a pump in which oxygen-enriched fluid is mixed with liquid that is sufficiently oxygen depleted, causing an oxygen-rich mixture to be recirculated into the aquatic environment.

It is yet another object of the present invention to provide an aeration and filtration system that can be adapted for use in a pond system or a high-volume tank system.

It is yet another object of the present invention to provide a system that may be substituted for a conventional drain field.

It is yet another object of the present invention to provide a system that may be used in soils or locations that are not suitable to accommodate a conventional drain field.

It is still a further object of the present invention to provide an aeration and filtration system that can be manufactured and installed at minimum cost.

Other advantages and aspects of the present invention will become apparent upon reading the following description of the drawings and the detailed description of the invention.

BRIEF DESCRIPTION OF THE DRAWINGS

FIG. 4 is a top planar view of a generally rectangular configuration for the aeration and filtration system according to the present invention;

FIG. 5 is a cross-sectional view of the circular configuration for aeration and filtration system taken along lines 5—5 of FIG. 4;

FIG. 10 is a partial cross-sectional view of the aeration and filtration system taken along the lines 8—8, showing the pump in phantom and illustrating a heating and cooling coil.

DETAILED DESCRIPTION OF THE PREFERRED EMBODIMENT

Figure 1:
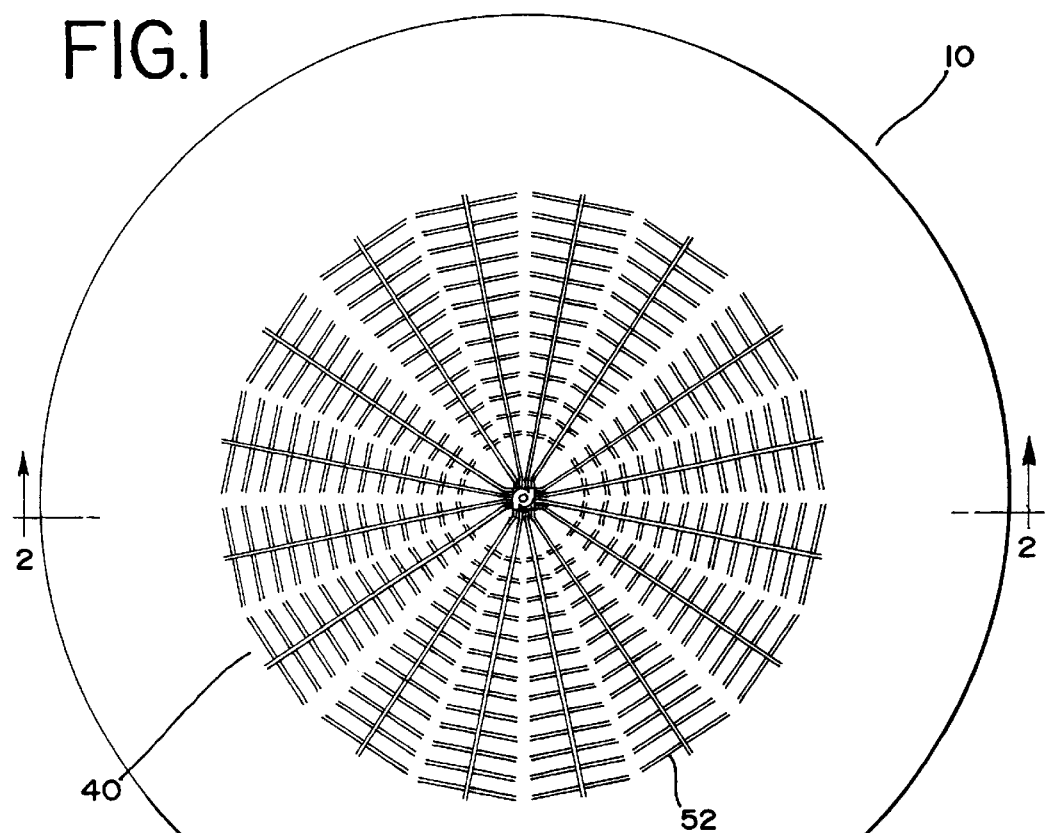
FIG. 1 is a top planar view of a circular configuration for the aeration and filtration system according to the present invention.
Figure 2:
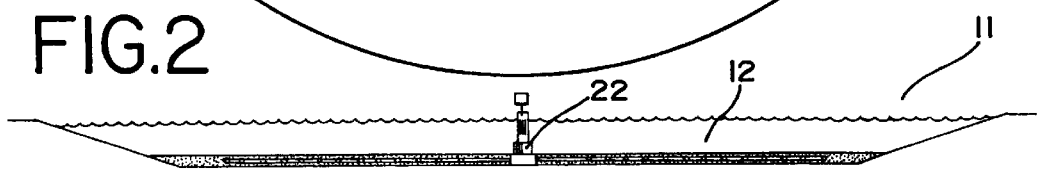
FIG. 2 is a cross-sectional view of the circular configuration for aeration and filtration system taken along lines 2—2 of FIG. 1.

This invention is susceptible of embodiment in many different forms. The drawings and the preferred embodiment illustrate one form of the invention. This disclosure is to be considered as but one example of the principles of the invention. The disclosure is not intended to limit the broad aspect of the invention to the illustrated embodiments.

FIGS. 1–9 of the drawings disclose a packaged aeration and filtration system 10 for eliminating waste products in a fluid body 12 which has a surface floor 14. The invention is an aerobically balanced filter system 10 containing organic aerobic organisms which process waste products of the aquatic life living in the system. According to the present invention, and as seen in FIGS. 1–5, the filtration and aeration system 10 is designed for application in a pond 11. In particular, the system 10 may be used in a pond 11 for raising and sustaining various forms of aquatic life for commercial sales, environmental testing, or other high-volume applications. It is also contemplated that the present system be used as a substitute for conventional drain fields or in locations where the soil is unsuitable for use of a conventional drain field. Alternatively, and with reference to FIGS. 6–8, the present invention may be implemented in an enclosed, high-volume tank 13, such as may be found in commercial fisheries and hatcheries for farming large quantities of fish and other aquatic life. Generally, the aeration and filtration system 10 includes a support bed 16, a filter bed 20, a pump 22, a plurality of perforated pipes 52, and a motor 24.

As shown in FIGS. 1–8, and especially in FIG. 5, the support bed 18 is disposed above the surface floor 14 of the fluid body 12. The support bed 18 includes a substratum support material 26 and a fabric overlay 28. The substratum support 26 is disposed on the surface floor 14 and the fabric overlay 28 is disposed above the substratum support 26 and perforated pipes 52. The substratum support 26 may be built using ceramic tile, e.g., broken ceramic tile or a plurality of aligned wooden planks. In fact, the substratum support 26 can be made of any material capable of supporting the filter bed 20 and the fluid body 12. The fabric overlay 28 is generally a fabric of sufficient porosity to support the filter bed 20. However, it is also necessary that the fabric overlay 28 be of sufficient density to prevent the filter bed media 20 from falling into the support 16.

In the preferred embodiment, the support bed 18 is comprised of a substratum support 26 and a fabric overlay 28. However, the support bed 18 and the filter bed 20 may also be consecutive layers of porous media. Particularly, the media may be layered such that the size of the media increases away from the filter bed 20, with the largest media being disposed on the surface floor 14.

Figure 3:
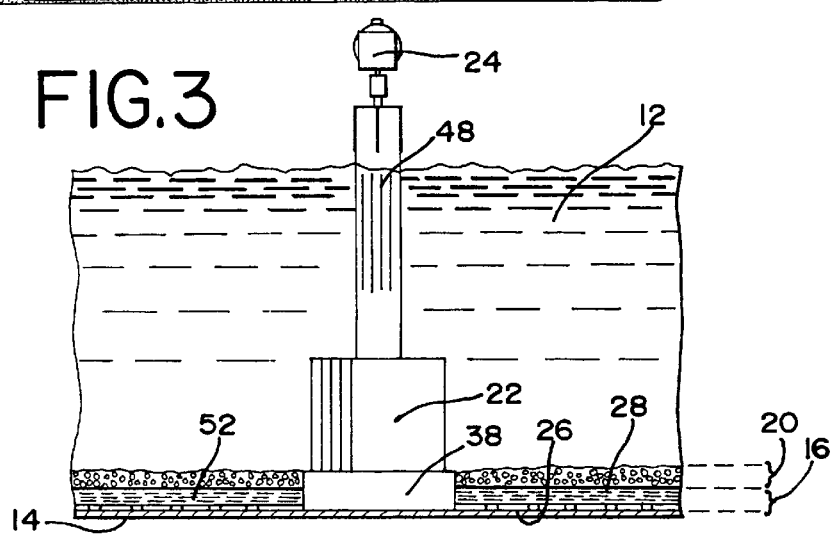
FIG. 3 is an enlarged view of FIG. 2.
Figure 8:
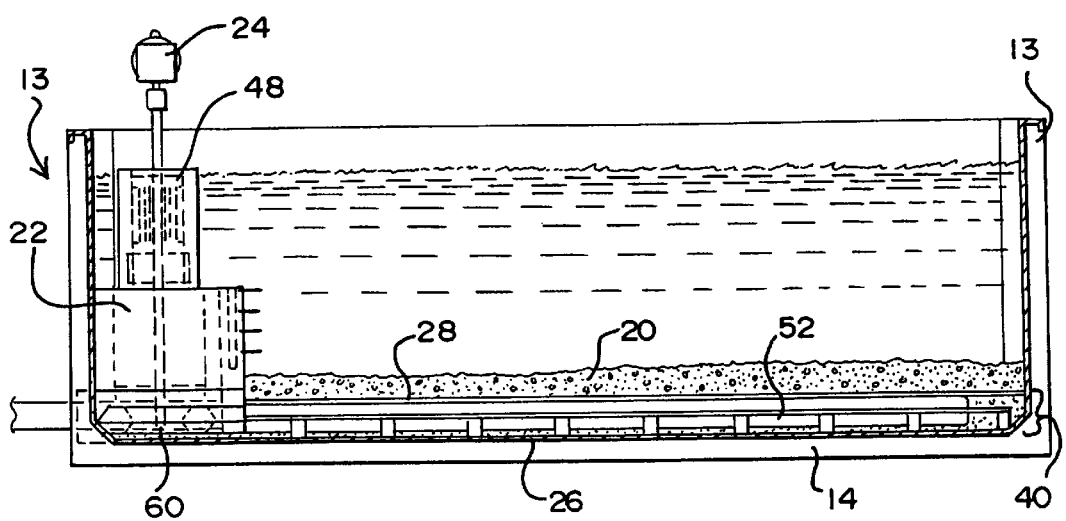

As seen in FIGS. 3 and 8, the filter bed 20 is comprised of a porous media which is disposed above the support bed 18. The porous media must be of sufficient surface area to facilitate fluid flow through the filter bed 20. Additionally, the media must be of sufficient surface area to facilitate aerobic bacterial growth on the media 30. Typically, the porous media of the filter bed 20 is comprised of gravel of an optimal size to sustain the desired quantity of aquatic life. The gravel may generally be any commercially available gravel that meets the above-mentioned surface area specifications.

Figure 9:
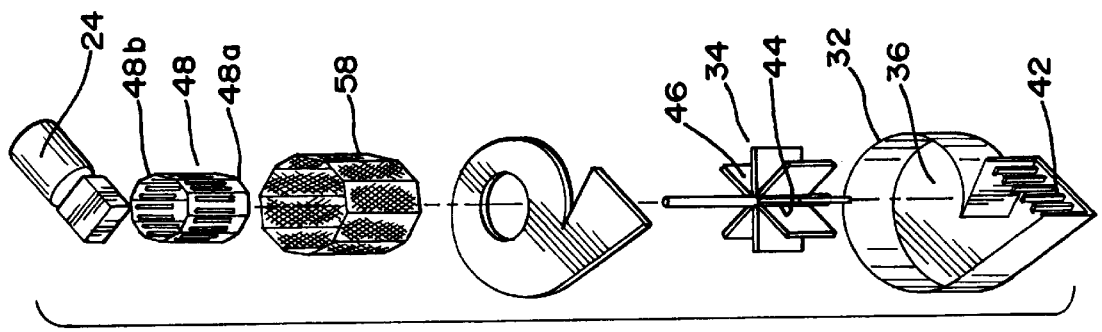
FIG. 9 is an exploded perspective view of the pump used in the aeration and filtration system.
Figure 6:
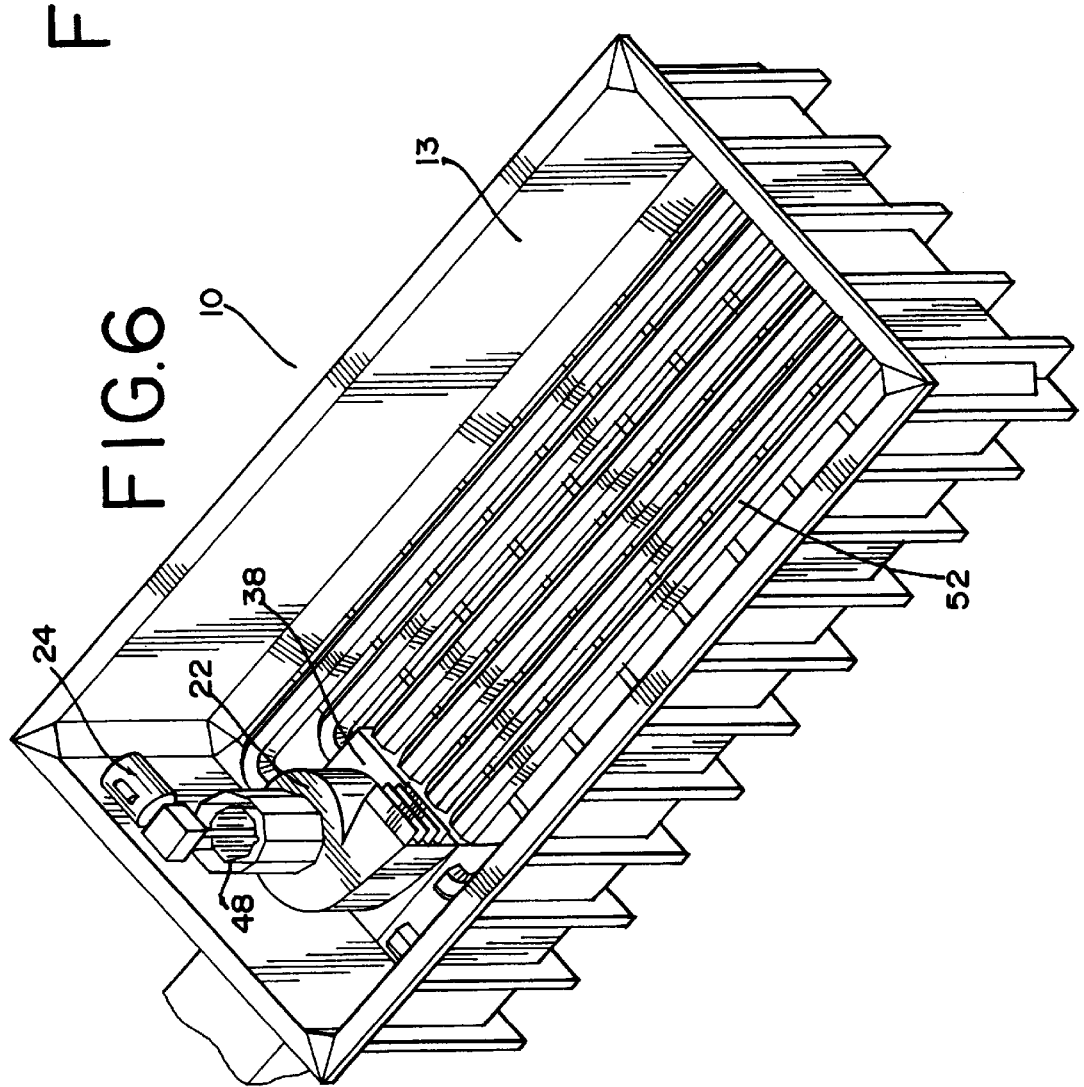
FIG. 6 is a perspective view of the aeration and filtration system, illustrating the use of the aeration and filtration system in a high-volume tank.
Figure 7:
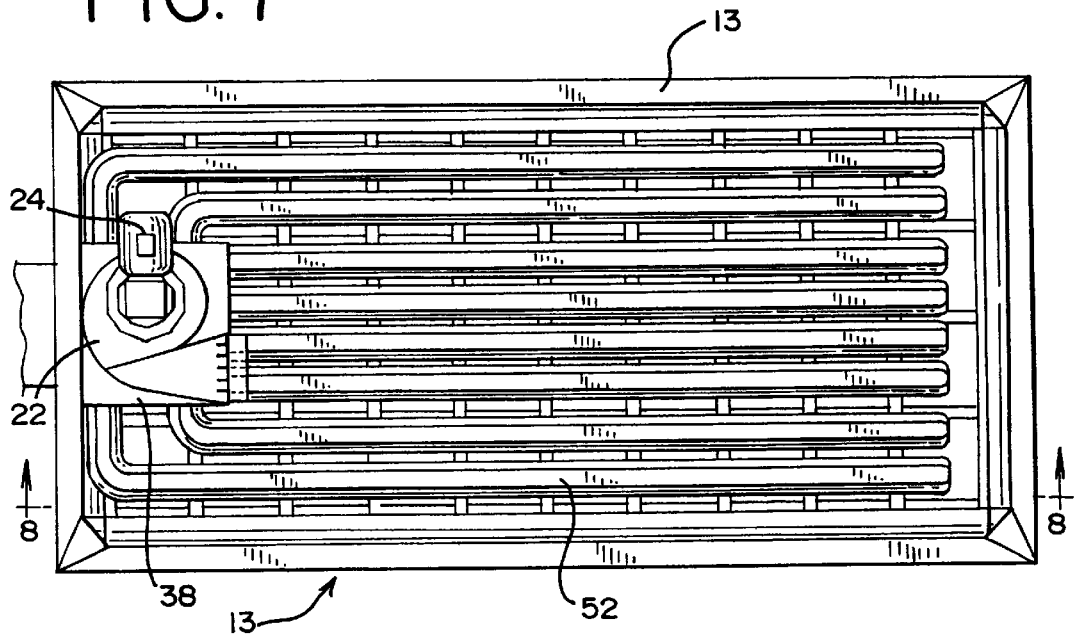
FIG. 7 is a top planar view of the aeration and filtration system, illustrating the use of the aeration and filtration system in a high-volume tank; and, FIG. 8 is a cross-sectional view of the aeration and filtration system taken along the lines 8—8, illustrating the use of the aeration and filtration system in a high-volume tank.

The aeration and filtration system 10 further includes a pump 22 having multiple inlets. As seen in FIG. 9, the pump 22 consists of a housing 32 which can generally be described as having upper and lower portions. The housing 32 contains a rotatable impeller 34. Fluid (i.e., water) 12 and oxygen are drawn into the impeller 34 from an upper inlet, while a lower inlet draws fluid (i.e., water) 12 through the filter bed 20 into the impeller 34. The water and oxygen is then mixed within the chamber 36 of the housing 32 to form an oxygen-rich mixture. The lower portion of the chamber 36 includes a header box 38 which receives oxygen-depleted water from a lower water inlet system 40. The oxygen-depleted liquid is mixed with the oxygen-rich mixture in the impeller 34. The oxygen-rich mixture is then discharged into the fluid body 12 by way of an outlet 42 in the housing 32 of the pump 22. Generally, the pump outlet 42 includes a discharge damper to prevent fish from entering the pump outlet 42.

As indicated above, the pump 22 is a high volume, low pressure system that will rapidly re-circulate the water within the tank. By way of example and not of limitation, the pump 22 recirculates the fluid 12 within the tank 10 at a rate of between 25% and 35% of fluid 12 per minute. The pond system 11 recirculates the approximately 100% of the fluid 12 in approximately four (4) to sixteen (16) hours.

In the preferred embodiment, the pump impeller 34 consists of a central hub 44 that has a plurality of circumferentially spaced, radially extending blades 46 extending from the periphery of the central hub 44. The central hub 44, in turn, is rotatably supported in the housing 32. Also, the extending inlet member 48 is generally axially aligned with the central hub 44 of the impeller 34.

Both the lower water inlet system 40, in the pond 11 (shown in FIGS. 1 and 4) and in the high-volume tank 13 (shown in FIGS. 6–7), are comprised of a plurality of perforated pipes 52 extending from the header box 38. The perforated pipes 52 are necessary to entrain and funnel the high volume of oxygen-depleted mixture that flows through the filter bed 20. Each perforated pipe is a conventional PVC flexible pipe, having perforated openings at predetermined intervals along the length of the pipes 52. While the preferred embodiment employs conventional PVC pipes, it is contemplated that the perforated pipes 52 may be made from any material that allows flexibility. The header box 38 and the perforated pipes 52 are disposed below the filter bed 20 and the fabric overlay 28, but generally above the surface floor 14. Typically, the lower inlet system 40 includes backwash pipes (not shown) to prevent clogging of the perforations and prohibit obstruction of the flow through the filter bed 20. The backwash pipes (not shown) allow one to periodically push a reverse flow of water through the filter bed media 20, forcing any residual waste from the perforated openings and the gaps in the filter bed 20. Compressed air is expanded within the perforated pipes 52 to temporarily reverse the flow of fluid through the perforated pipes 52 and filter bed 20.

In the pond configuration 11 (shown in FIGS. 1 and 4) or in the high-volume tank configuration 13 (shown in FIGS. 6–7), at least one of the pump inlets is an extended member 48 which has a first end 48a and a second end 48b. The first end 48a of the extended member 48 is connected to the pump 22, and the second end 48b extends out of the fluid and into the atmosphere above the fluid body 12. The extended member 48 also has inlet slots 49 that are adjacent to the fluid body 12. Typically, the extended member 48 includes a filter screen 58 surrounding the perimeter of the inlet slots 49. The filter screen 58 assists in filtering the liquid entering the pump 22 through the extended member 48. The filter screen 58 also prevents fish from entering the pump 22 through the inlet slots 49 of the extended member 48. The inlet slots 49 may be holes, weirs, or other such openings that allow the fluid 12 to enter the pump 22. It is contemplated that the position and shape of such openings may be changed to improve entrapment of air (oxygen) in the water drawn into the extended member 48.

The pump 22 is connected to a conventional drive motor 24 which allows the pump 22 to operate at varying speeds. The drive motor 24 is, in turn, connected to a external power source.

In the enclosed high-volume tank 13 (shown in FIGS. 6–7), the system further includes a heating and cooling coil 60. The heating and cooling coil 60 allows the user to adjust or stabilize the temperature of the tank at an optimal level for maintaining the aquatic life within the system. In the preferred embodiment, the heating and cooling coil 60 is located in the lower portion of the pump housing 32. It is contemplated, however, that the heating and cooling coil 60 may be disposed anywhere within the system 10 that allows the temperature of the fluid body 12 to be regulated. The heating and cooling coil 60 is connected to a conventional remotely located heat pump 61 and power source (not shown).

When the aeration and filtration system is in use, the pump 22 draws liquid through the various inlets from the fluid body 12 while also drawing oxygen from the surrounding atmospheric air. The liquid is mixed with the oxygen by the impeller 34 in the chamber 36 of the pump 22. The product is an oxygenated liquid mixture. In particular, the system 10 uses a low speed, high volume pump 22 designed to maximize oxygenation of the liquid which is discharged back into the fluid body 12. The rotation of the impeller 34 within the pump 22 produces negative pressure adjacent the slots in the extended inlet member 48, as well as in the lower inlet perforated pipes 52. The liquid flows into the extended inlet member 48 and flows by suction into the chamber 36 of the pump 22 to which the first end 48a of the extended inlet member 48 is connected. At the same time, the suction of the pump 22 entrains air in the liquid within the tube, creating an oxygen-rich mixture to be mixed with the oxygen-depleted liquid being suctioned into the pump 22 though the lower inlet system 40.

At the same time that the oxygen-rich mixture is being created within the upper portions of the pump 22, the rotation of the impeller 34 is drawing liquid to and through the filter bed 20 and into the pump 22 via the perforated pipes 52 in the lower inlet system 40. As discussed above, the water flowing through the filter bed 20, and thus, the perforated pipes 52 is sufficiently oxygen-depleted. The oxygen-depleted liquid is mixed in the pump chamber 36 with the oxygenated mixture to produce an oxygen-rich liquid mixture. Thus, the pump 22 will provide a thorough oxygen-enriched mixture that is delivered through the discharge opening in the pump housing 32 and into the body of liquid.

The system further operates to transfer large volumes of fluid through the gravel filter bed 20. The flow of fluid through the filter bed 20 causes the entrainment of waste products, food and bacteria onto and into the gravel comprising the filter bed 20. Moreover, growth of organic aerobic bacteria on the gravel is facilitated because the oxygen-enriched mixture delivered into the body of liquid through pump outlet 42 is drawn towards the surface floor 14. Optimal surface area of the filter media 30, as well as the high flow rate of fluid through the filter bed 20, helps to encourage aerobic bacterial growth by creating conditions favorable to their existence. Because the organic aerobic organisms consume waste in the system, metabolic toxin levels in the system are reduced. Consequently, an aerobically balanced filter system is created by using the organic aerobic organisms to process the waste products of the higher aquatic life forms being farmed in the system. This facilitates an increased period between any required water or filter replacement in the system.

Where this system is used to treat an effluent having a high biological oxygen demand (BOD), a larger filter bed 20 may be used. Furthermore, the free height of the fluid 12 above the filter bed 20 may be reduced.

While specific embodiments have been illustrated and described, numerous modifications to the embodiments would not significantly depart from the spirit of the invention. The scope of protection is only limited by the scope of the accompanying Claims.

I claim:

1. An aeration and filtration system for eliminating waste products in a liquid, the aeration and filtration system comprising:

a liquid body structure having a surface floor for supporting the liquid;

a support bed disposed above the surface floor, said support bed supporting a filter bed of porous media disposed above the support bed;

a pump having a housing and an impeller rotatable within the housing;

a plurality of inlets in fluid communication with the housing, said inlets including perforated pipes within said liquid body structure and an extended member; and, a motor operatively connected to the pump impeller, wherein said pump is capable of drawing a liquid through the filter bed, perforated pipes, and the extended member, and air through the extended member from the surrounding atmosphere such that the liquid and air are mixed within the housing to form an oxygenated liquid mixture.

2. The aeration and filtration system of claim 1, further including the liquid, said liquid disposed within the liquid body structure wherein said liquid is substantially depleted of oxygen.

3. The aeration and filtration system of claim 2 wherein the liquid body structure is a pond structure.

4. The aeration and filtration system of claim 2, wherein the extended member has slots for drawing the liquid into the pump, the extended member further having a first end and a second end, the first end being connected to the pump, the second end extending above and out of the liquid for drawing said air into the pump.

5. The aeration and filtration system of claim 1 wherein the support bed includes a substratum support material disposed on the surface floor and a fabric overlay covering the substratum support material, the fabric overlay being of such porosity to support the filter bed and to prevent the filter bed media from falling into the substratum support covering the substratum support material, the fabric overlay being of such porosity to support the filter bed and to prevent the filter bed media from falling into the substratum support material.

6. The aeration and filtration system of claim 5 wherein the substratum support material is gravel.

7. The aeration and filtration system of claim 5 wherein the substratum support material is broken ceramic tile.

8. The aeration and filtration system of claim 5 wherein the substratum support material is a plurality of aligned wooden planks.

9. The aeration and filtration system of claim 5 wherein the fabric overlay includes a heavy fabric mesh supporting a fine fabric mesh.

10. The aeration and filtration system of claim 1 wherein the porous media of the filter bed facilitates liquid flow through the filter bed and wherein the media further facilitates aerobic bacterial growth on the media.

11. The aeration and filtration system of claim 10 wherein the support bed is a plurality of porous media, the media being layered so that the size of the media increases below the filter bed such that the largest media is disposed on the surface floor.

12. The aeration and filtration system of claim 10 wherein the porous media of the filter bed is gravel.

13. The aeration and filtration system of claim 1 further including a device for preventing fish from entering the pump.

14. The aeration and filtration system of claim 13 wherein the device for preventing fish from entering the pump is a screen covering the pump inlets.

15. The aeration and filtration system of claim 13 wherein the device for preventing fish from entering the pump is a discharge damper.

16. The aeration and filtration system of claim 1 wherein the liquid body structure is a tank and the surface floor is a bottom wall, the tank has side walls appending upwardly from said bottom wall.

17. The aeration and filtration system of claim 16 further including a heating and cooling coil mounted in an area of turbulent flow within the pump housing to adjust or maintain the temperature of the liquid, the heating and cooling coil being connected to a remotely located heat pump.

18. An aeration and filtration system for eliminating waste products in a liquid, the aeration and filtration system comprising:

a tank having a surface floor for supporting the liquid;

a support bed disposed above the surface floor of the tank, the support bed having a substratum support material disposed on the surface floor and a fabric overlay covering the substratum support material, the fabric overlay being of such porosity to support the filter bed and to prevent the filter bed media from falling into the substratum support material;

a filter bed of porous media for producing aerobic bacteria, the filter bed being disposed above the support bed;

a pump having a plurality of inlets adjacent the liquid to draw liquid from the tank and oxygen from the surrounding atmosphere to be mixed therewith to produce an oxygenated liquid mixture, at least one of the inlets being an extended member, the extended member having slots adjacent the liquid for drawing liquid into the pump, the extended member further having a first end and a second end, the first end being connected to the pump, the second end extending above and out of the liquid for drawing oxygen into the pump and at least some of the inlets being a plurality of perforated pipes for drawing liquid substantially depleted of oxygen from below the filter bed to be mixed with said oxygen to produce an oxygen-rich liquid mixture, the pump further having a header box and a housing, the housing having an impeller rotatable in the housing, the pipes being connected to the header box and further being disposed between the support bed and the filter bed; and, a motor connected to the pump.

19. The aeration and filtration system of claim 18 further including backwash pipes connected to the perforated pipes to reverse the flow of air through the filter bed media.

20. The aeration and filtration system of claim 18 further including a heating and cooling coil mounted in an area of turbulent flow within the pump housing to adjust or maintain the temperature of the liquid, the heating and cooling coil being connected to a remotely located heat pump.

21. The aeration and filtration system of claim 18 wherein the substratum support material is broken ceramic tile.

22. The aeration and filtration system of claim 18 wherein the substratum support material is gravel.

23. The aeration and filtration system of claim 18 wherein the substratum support material is a plurality of aligned wooden planks.

24. The aeration and filtration system of claim 18 wherein the fabric overlay includes a heavy fabric mesh supporting a fine fabric mesh.

25. The aeration and filtration system of claim 18 wherein the porous media of the filter bed facilitates fluid flow through the filter bed and aerobic bacterial growth on the media.

26. The aeration and filtration system of claim 25 wherein the support bed is a plurality of porous media, the media being layered so that the size of the media increases below the filter bed such that the largest media is disposed on the surface floor.

27. The aeration and filtration system of claim 25 wherein the porous media of the filter bed is gravel.

28. The aeration and filtration system of claim 18 further including a device for preventing fish from entering the pump.

29. The aeration and filtration system of claim 28 wherein the device for preventing fish from entering the pump is a screen covering the pump inlets.

30. The aeration and filtration system of claim 28 wherein the device for preventing fish from entering the pump is a discharge damper.

31. The aeration and filtration system of claim 1 wherein the pump includes a header box, the perforated pipes being connected to the header box.

* * * * *